United States Patent
Rezagholizadeh et al.

(10) Patent No.: US 11,003,995 B2
(45) Date of Patent: May 11, 2021

(54) SEMI-SUPERVISED REGRESSION WITH GENERATIVE ADVERSARIAL NETWORKS

(71) Applicants: Mehdi Rezagholizadeh, Montreal (CA); Md Akmal Haidar, Montreal (CA); Dalei Wu, St. Laurent (CA)

(72) Inventors: Mehdi Rezagholizadeh, Montreal (CA); Md Akmal Haidar, Montreal (CA); Dalei Wu, St. Laurent (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 874 days.

(21) Appl. No.: 15/789,518

(22) Filed: Oct. 20, 2017

(65) Prior Publication Data

US 2018/0336471 A1 Nov. 22, 2018

Related U.S. Application Data

(60) Provisional application No. 62/508,819, filed on May 19, 2017.

(51) Int. Cl.
*G06N 3/04* (2006.01)
*G06N 3/08* (2006.01)

(52) U.S. Cl.
CPC ........... *G06N 3/088* (2013.01); *G06N 3/0454* (2013.01); *G06N 3/0472* (2013.01); *G06N 3/08* (2013.01)

(58) Field of Classification Search
CPC .............................. G06N 3/0454; G06N 3/088
See application file for complete search history.

(56) References Cited

U.S. PATENT DOCUMENTS

| | | | |
|---|---|---|---|
| 7,941,382 B2 | 5/2011 | Stokes et al. | |
| 8,781,782 B2 | 7/2014 | Yuan | |
| 2012/0158624 A1 | 6/2012 | Lingenfelder et al. | |
| 2019/0080205 A1* | 3/2019 | Kaufhold | G06K 9/6257 |

FOREIGN PATENT DOCUMENTS

| | | |
|---|---|---|
| CN | 104484682 A | 4/2015 |
| CN | 106296692 A | 1/2017 |

OTHER PUBLICATIONS

Nasim Soul Yet al: "Semi and Weakly Supervised Semantic Segmentation Using Generative Adversarial Network", arxiv.org, Cornell University Library, 201 Olin Library Cornell University Ithaca, NY 14853, Mar. 28, 2017 (Mar. 28, 2017), total 14 pages. XP080752699.

(Continued)

*Primary Examiner* — Hal Schnee

(57) ABSTRACT

Method and system for performing semi-supervised regression with a generative adversarial network (GAN) that includes a generator comprising a first neural network and a discriminator comprising a second neural network, comprising: outputting, from the first neural network, generated samples derived from a random noise vector; inputting, to the second neural network, the generated samples, a plurality of labelled training samples, and a plurality of unlabelled training samples; and outputting, from the second neural network, a predicted continuous label for each of a plurality of the generated samples and unlabelled samples.

21 Claims, 8 Drawing Sheets

(56) References Cited

OTHER PUBLICATIONS

Tim Salimans et al: Improved Techniques for Training GANs, 30th Conference on Neural Information Processing Systems (NIPS 2016), Barcelona, Spain, total 10 pages. XP55506346.

Tachibana Ryosuke et al: Semi-Supervised learning using adversarial networks, ICIS 2016, Jun. 26-29, 2016, total 6 pages. XP32948520.

Eder Santana et al. Learning a Driving Simulator, Machine Learning, Aug. 3, 2016, total 8 pages. XP080718041.

Jost Tobias Springenberg:"Unsupervised and Semi-supervised Learning with Categorical Generative Adversarial Networks", arXiv:1511.06390, Apr. 30, 2016, total 20 pages. XP55506693.

Mehdi Rezagholizadeh et al. Reg-Gan:Semi-Supervised Learning Based on Generative Adversarial Networks for Regression, 2018 IEEE International Conference Onacoustics, Speech and Signal Processing (ICASSP). IEEE, Apr. 15, 2018 (Apr. 15, 2018), pp. 2806-2810, XP033401798.

I. J. Goodfellow et al., "Generative Adversarial Nets", NIPS 2014, https://arxiv.org/pdf/1406.2661.pdf.

A. Radford et al., "Unsupervised Representation Learning with Deep Convolutional Generative Adversarial Networks", ICLR 2016, https://arxiv.org/pdf/1511.06434.pdf.

T. Salimans et al., "Improved Techniques for Training GANs", 2016, https://arxiv.org/pdf/1606.03498.pdf.

D. Warde-Farley et al., "Improving Generative Adversarial Networks with Denoising Feature Matching", ICLR 2017, https://openreview.net/pdf?id=S1X7nhsxl.

M. Arjovsky et al., "Towards Principled Methods for Training Generative Adversarial Network", ICLR 2017, https://arxiv.org/pdf/1701.04862.pdf.

M. Arjovsky et al., "Wasserstein GAN", 2017, https://arxiv.org/pdf/1701.07875.pdf.

A. Shrivastava et al., "Learning from Simulated and Unsupervised Images through Adversarial Training", 2016, Apple Inc., https://arxiv.org/pdf/1612.07828.pdf.

L. Sixt et al., "RENDERGAN: Generating Realistic Labeled Data", ICLR 2017, https://arxiv.org/pdf/1611.01331.pdf.

X. Mao et al., "Least Squares Generative Adversarial Networks", 2017, https://arxiv.org/pdf/1611.04076.pdf.

J. T. Springenberg, "Unsupervised and Semi-Supervised Learning with Categorical Generative Adversarial Networks", ICLR 2016, https://arxiv.org/pdf/1511.06390.pdf.

A. Odena, "Semi-Supervised Learning with Generative Adversarial Networks", 2016, https://arxiv.org/pdf/1606.01583.pdf.

C. Li et al., "Triple Generative Adversarial Nets", 2017, https://arxiv.org/pdf/1703.02291.pdf.

Z.-H. Zhou et al., "Semi-Supervised Regression with Co-Training", IJCAI 2005, https://pdfs.semanticscholar.org/437c/85ad1c05f60574544d31e96bd8e60393fc92.pdf.

Y. Yang et al., "An Extended Semi-Supervised Regression Approach with Co-Training and Geographical Weighted Regression: A Case Study of Housing Prices in Beijing", ISPRS International Journal of Geo-Information, 5(1):4, 2016.

D. P. Kingma et al., "Semi-Supervised Learning with Deep Generative Models", 2014, https://arxiv.org/pdf/1406.5298.pdf.

M. Bojarski et al., "End to End Learning for Self-Driving Cars", 2016, https://arxiv.org/pdf/1604.07316.pdf.

A. Ghosh et al.,"SAD-GAN: Synthetic Autonomous Driving Using Generative Adversarial Networks", 2016, https://arxiv.org/pdf/1611.08788.pdf.

G. E. Hinton et al., "A fast learning algorithm for deep belief nets", Neural Computation 2006, 18(7):1527-1554.

B. Huval et al., "An Empirical Evaluation of Deep Learning on Highway Driving", 2015, https://arxiv.org/pdf/1504.01716.pdf.

M. Johnson-Roberson et al., "Driving in the Matrix: Can Virtual Worlds Replace Human-Generated Annotations for Real World Tasks?", 2016, https://arxiv.org/pdf/1610.01983.pdf.

D. P. Kingma et al., "Auto-Encoding Variational Bayes", 2014, https://arxiv.org/pdf/1312.6114.pdf.

A. Kuefler et al., "Imitating Driver Behavior with Generative Adversarial Networks", 2017, https://arxiv.org/pdf/1701.06699.pdf.

R. Salakhutdinov et al., "Restricted Boltzmann Machines for Collaborative Filtering", Proceedings of the 24th International Conference on Machine Learning, pp. 791-798, ACM, 2007.

E. Banijamali et al. "Generative Mixture of Networks", 2017, https://arxiv.org/pdf/1702.03307.pdf.

Wang, Kunfeng et al. Generative Adversarial Networks: The State of the Art and Beyond Acta Automatica Sinica Mar. 31, 2017, No. 3 vol. 43, 12 pages.

\* cited by examiner

SEMI-SUPERVISED REGRESSION WITH GENERATIVE ADVERSARIAL NETWORKS

RELATED APPLICATIONS

This application claims the benefit of and priority to U.S. Provisional Patent Application No. 62/508,819 filed May 19, 2017, the contents of which are incorporated herein by reference.

FIELD

The present disclosure relates to generative adversarial networks, and in particular to semi-supervised regression learning in generative adversarial networks.

BACKGROUND

Deep learning has shown great success in various domains such as natural language processing (NLP), autonomous driving, gaming, and unsupervised learning. Generative adversarial networks (GANs) have been developed to generate synthetic realistic images. GANs correspond to a minimax two-player game where two models are trained simultaneously: a generative model G that captures data distribution, and a discriminative model D that computes the probability that a sample comes from the training data rather than the generator.

GAN solutions can be useful when there is a scarcity of training samples.

Despite the recent advances in GANs, critical issues remain with regards to evaluating, training, and labeling generated samples.

SUMMARY

Example aspects of the present disclosure provide a method and system for performing semi-supervised regression with generative adversarial networks. In some examples, a GAN based solution is applied that can generate realistic, high quality samples and also predict continuous labels for generated samples and unlabelled samples of a training dataset.

In example embodiments, a GAN is disclosed for predicting continuous labels based on a training dataset that has only a limited number of labelled samples. Labels can be predicted for both unlabelled training samples and generated samples as well. The GAN can be applied for example in autonomous driving applications such as determining a steering angle.

According to a first aspect is a method for training a generative adversarial network (GAN) that includes a generator comprising a first neural network and a discriminator comprising a second neural network. The method includes outputting, from the first neural network, generated samples derived from a random noise vector; inputting, to the second neural network, the generated samples, a plurality of labelled training samples, and a plurality of unlabelled training samples; and outputting, from the second neural network, a predicted continuous label for each of a plurality of the generated samples and unlabelled samples.

In some example embodiments, the second neural network outputs each continuous label as a normalized value. In some examples, the method includes outputting from the second neural network a probability that an inputted sample is a real sample.

In some example embodiments, the method includes determining a probability that a generated sample is a real sample and is based on the continuous label predicted for generated sample. In some examples, determining the probability is performed at a kernel function and is based on whether the normalized value for a continuous label falls within a predetermined range.

In some examples, the labelled training samples include a series of front camera image samples for a moving vehicle that are each labelled with a steering angle.

In some examples, the method includes, until parameters of the neural networks converge: repeating the outputting of generated samples derived from the first neural network, the inputting of the generated samples, labelled training samples, and unlabelled training samples to the second network, and the outputting predicted continuous labels from the second neural network. During each repetition, respective loss functions are calculated for the second neural network and the first neural network, and weighting parameters of the second neural network and the first neural network are adjusted based on the calculated loss functions.

In some examples, the loss function for the first neural network includes a feature matching loss function based on a difference between an output of an intermediate layer of the second neural network for the training samples and generated samples respectively. Furthermore, in some configurations the loss function for the second neural network is a combination of a supervised portion and an unsupervised portion. In some examples, the supervised portion is based on a difference between real labels and predicted continuous labels for the labelled samples provided to the second neural network.

According to a second aspect is a system for training a generative adversarial network (GAN) that includes a generator comprising a first neural network and a discriminator comprising a second neural network. The system includes a processing device and a memory coupled to the processing device. The memory stores computer-executable instructions that, when executed by the processing device, cause the system to: define the first neural network and the second neural network; output, from the first neural network, generated samples derived from a random noise vector; input, to the second neural network, the generated samples, a plurality of labelled training samples, and a plurality of unlabelled training samples; and output, from the second neural network, a predicted continuous label for each of a plurality of the generated samples and unlabelled samples.

In some examples of the system the second neural network outputs each continuous label as a normalized value. In some examples, the system outputs from the second neural network a probability that an inputted sample is a real sample. In some examples the system is configured to determine the probability that a generated sample is a real sample based on the continuous label predicted for generated sample. In some examples, the system is configured to define a kernel function and the probability is determined at the kernel function based on whether the normalized value for a continuous label falls within a predetermined range.

According to a further aspect is a computer program product comprising a computer readable medium storing computer executable instructions that are configured to cause a processing system perform a method of: defining a generative adversarial network (GAN) that includes a generator comprising a first neural network and a discriminator comprising a second neural network; outputting, from the first neural network, generated samples derived from a random noise vector; inputting, to the second neural network, the generated samples, a plurality of labelled training samples, and a plurality of unlabelled training samples; and outputting, from the second neural network, a predicted continuous label for each of a plurality of the generated samples and unlabelled samples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
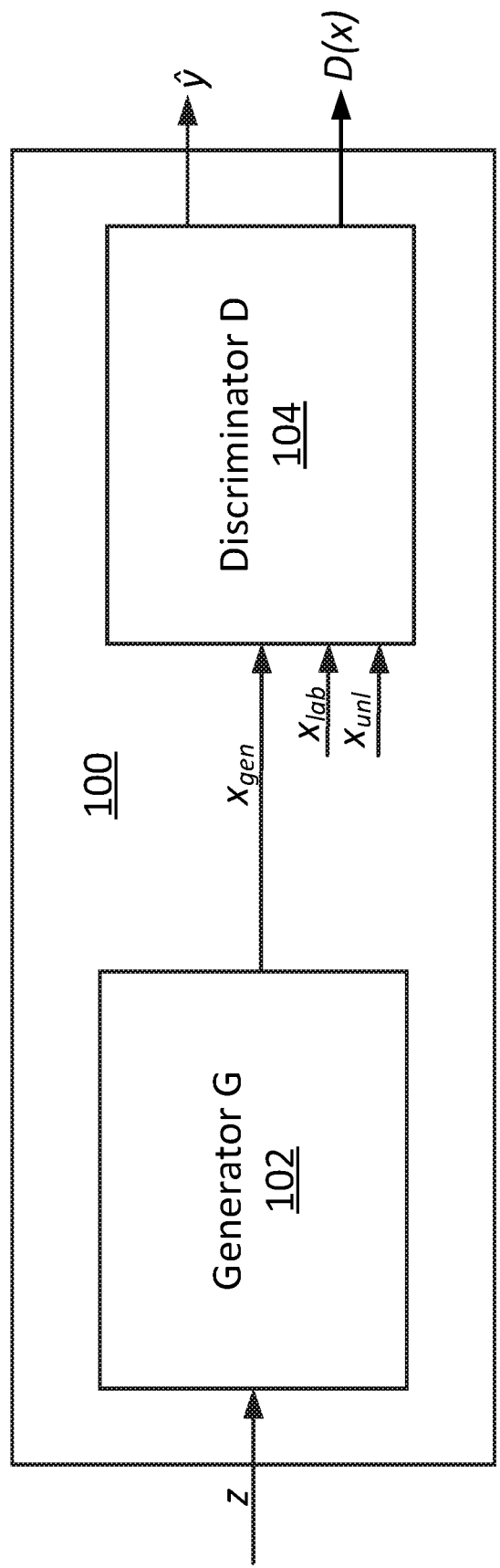
FIG. 1 is a block diagram of a Generative adversarial network (GAN) according to a first example embodiment.

Generative adversarial networks (GANs) include two separate deep networks: a generator network and a discriminator network. The generator network (generally referred to in the art as a generator) is implemented by a first neural network and the discriminator network (generally referred to in the art as a discriminator) is implemented by a second neural network. The generator is trained to take in a random variable, z, with a distribution $P_z(z)$ and map the random variable z to an output value within a data distribution $P_{data}(X)$ of a training dataset. The discriminator provides a training signal for the generator. The output distribution $P_{model}(X)$ of the generator should converge to the data distribution $P_{data}(X)$ during training. On the other hand, the discriminator is expected to discern real samples (also referred to herein as true samples) from generated samples by giving the output of 1 or 0 respectively. In the GAN training process, the generator and discriminator are used to generate samples and classify them respectively by improving the performance of each other in an adversarial manner. In this regard, as described in "I. J. Goodfellow, J. P.-Abadie, M. Mirza, B. Xu, D. W.-Farley, S. Ozair, A. Courville, and Y. Bengio, "Generative adversarial nets", NIPS 2014, https://arxiv.org/pdf/1406.2661.pdf, Advances in neural information processing systems, pages 2672-2680, 2014". The following adversarial loss function can be employed in training the generator and discriminator:

$$\min_G \max_D \{E_{x \sim P_{data}(x)}[\log D(x)] + E_{z \sim P_z(z)}[\log(1 - D(G(z)))]\}. \quad \text{Equation 1:}$$

A GAN implements a two-player minimax game with the objective of deriving a Nash-equilibrium point. Finding the solution of this game is non-trivial and there has been a volume of research in this domain resulting in various types of GAN designs. Most of these GAN designs are directed to improving training stability and the quality of generated synthesized samples and many of these GAN designs rely on heuristics to find stable architectures to solve the unstable training issue. A GAN can be useful to generate additional realistic synthetic samples to use as future training samples when there is a scarcity of real training samples. However, existing GAN systems lack the ability to effectively predict labels for the generated synthetic samples.

Semi-supervised learning techniques take advantage of both labelled and unlabelled data samples when predicting sample labels. Semi-supervised learning techniques, which improve the performance of a supervised task such as classification by learning based on additional unlabelled samples, require a lower number of labelled samples for training. This makes semi-supervised learning techniques suitable for applications where the number of labelled samples is limited in the training set and obtaining labelled samples is expensive or difficult, such as autonomous driving. In this context, generative models, such as GAN, can be leveraged to generate realistic samples that can be added to a training dataset in a semi-supervised manner. For example, in "D. P. Kingma, S. Mohamed, D. J. Rezende, and M. Welling; Semi-supervised learning with deep generative models; Advances in Neural Information Processing Systems; pages 3581-3589, 2014", a semi-supervised learning method was proposed with deep generative models, illustrating the use of deep generative models and approximate Bayesian inference. Other semi-supervised techniques with GAN have been proposed, including for example improved-GAN, cat-GAN, SGAN, and Triple-GAN. However, previous GANs implemented semi-supervised techniques generally all focus on classification that uses a discrete number of labels.

Classification techniques select a label for an input sample from a set number (K) of labels (for example K=26 in the example of the upper-case English alphabet). On the other hand, regression methods assign a real number (e.g. floating type) as a label to each sample. Applying semi-supervised classification techniques to regression comes at a cost of converting continuous labels of a dataset to a discrete number of classes. Converting continuous labels (in the regression problem) to discrete number of classes (to make a classification problem) introduces quantization error to the training. In addition, applying classification techniques to regression problems typically requires the network to have more outputs compared to regression techniques, resulting in more network parameters. Hence, using semi-supervised classification techniques for regression problems is complex and inefficient.

Accordingly, there is a need for a solution that enables semi-supervised regression with a GAN. In this regard, example embodiments are described below in which a GAN generates synthetic samples that are realistic and high quality samples (e.g. generated samples that are indistinguishable from real training samples), and predicts continuous labels corresponding to the samples. In example embodiments, regression is addressed in the context of semi-supervised learning. In contrast to a classification task where there is only a limited number of classes, a regression task is defined as predicting a continuous label for each of a plurality of samples of a given dataset. A continuous label represents a continuous value or real number (e.g. floating number).

Example embodiments provide a GAN solution that is configured to generate samples and predict continuous labels for generated samples using a training dataset that has only a limited number of labelled samples. This enables the training dataset and generated samples to be used for training a more powerful deep network to be used in the regression task.

FIG. 1 illustrates a GAN 100 configured to implement semi-supervised regression in accordance to an example embodiment. GAN 100 includes a generator 102, configured to generate a set $X_{gen}$ of realistic generated samples $x_{gen}$ that is similar or close to the content of a training dataset $\{X_{lab}, X_{unl}\}$ of real labelled training samples $x_{lab}$ and real unlabelled training samples $x_{unl}$. GAN 100 also includes a discriminator 104, which includes a deep convolutional neural network (CNN), and is configured to both validate the generated samples $x_{gen}$ and predict continuous labels $\hat{y}$ for these samples. The discriminator 104 validates a sample x by outputting a predicted probability D(x) of whether the input sample x is a real sample (i.e. the input sample x is either a labelled training sample $x_{lab}$ or an unlabelled training sample $x_{unl}$) or a fake sample (i.e. the input sample x is a generated sample) $x_{gen}$.

In FIG. 1:
z: random noise vector
$x_{gen}$: generated samples
$x_{lab}$: labelled training samples
$x_{unl}$: unlabelled training samples
$\hat{y}$: predicted continuous labels
D(x): predicted probability of whether an input sample x is a real sample or a fake sample, where $x \in \{x_{gen}, x_{lab}, x_{unl}\}$.

In example embodiments, generator 102 is trained by employing a feature matching loss technique introduced in "T. Salimans, I. Goodfellow, W. Zaremba, V. Cheung, A. Redford, and X. Chen, "Improved techniques for Training GANs", https://arxiv.org/pdf/1606.3498.pdf, CoRR, abs/1606.03498, 2016. The feature matching loss $LOSS_{feature\_matching}$ is the average of the absolute difference between the output of an intermediate layer of the discriminator 104 for the true (real) samples $\{x_{lab}, x_{unl}\}$ and generated samples $x_{gen}$.

When training the generator 102, the feature matching loss $LOSS_{feature\_matching}$ is used. Accordingly, the loss function for generator 102 can be represented as:

$$LOSS_G = LOSS_{feature\_matching}$$

In the example of FIG. 1, discriminator 104 is configured with two outputs: one output is responsible for predicting a continuous label $\hat{y}$, and the other determines a probability D(x) that the generated sample $x_{gen}$ is real or fake. If true continuous labels are mapped (or normalized) to the range of [0,1], then a sigmoid nonlinearity in the last layer of the network of discriminator 104 can be used. The discriminator 104 is trained by using the combination of the usual unsupervised GAN loss function and a supervised regression loss:

$$LOSS_D = L_{unsupervised} + L_{supervised} \quad \text{(Equation 3)}$$

$$L_{supervised} = \|y - \hat{y}\| \quad \text{(Equation 4)}$$

$$L_{unsupervised} = E_{x \sim P_{data}(x)}[(D(x)-1)^2] + E_{z \sim P_z(z)}[(D(G(z)))^2] \quad \text{(Equation 5)}$$

Where:
z represents the noise drawn from a uniform or normal distribution;
x and G(z) describe the real ($x_{unl}$, $x_{lab}$) and generated samples ($x_{gen}$) respectively; y refers to the true (real) value of the label for a labelled training sample $x_{lab}$); and $\hat{y}$ indicate a predicted continuous label for a sample;
$L_{supervised}$ is calculated only in respect of labelled training samples $x_{lab}$ (for which the true (real) value of the label is known); and
$p_{data}(X)$ is the distribution of the training samples (both labelled and unlabelled).

The least-square loss function described in "X. Mao, Q. Li, H. Xie, R. Y. K. Lau, Z. Wang, and S. P. Smolley, "Least Squares Generative Adversarial Networks", 2017, https://arxiv.org/abs/1611.04076, arXiv preprint ArXiv: 1611.04076, 2016" is included in the unsupervised part of the above equation. In addition, in the case of labelled training samples $x_{lab}$, the supervised regression error (i.e. $L_{supervised} = \|y - \hat{y}\|$, the difference between the predicted and true continuous labels for the labelled training samples is added to the discriminator loss function $LOSS_D$ which helps in training the GAN to generate continuous labels for the unlabelled training samples $x_{unl}$ or generated samples $x_{gen}$.

Figure 2:
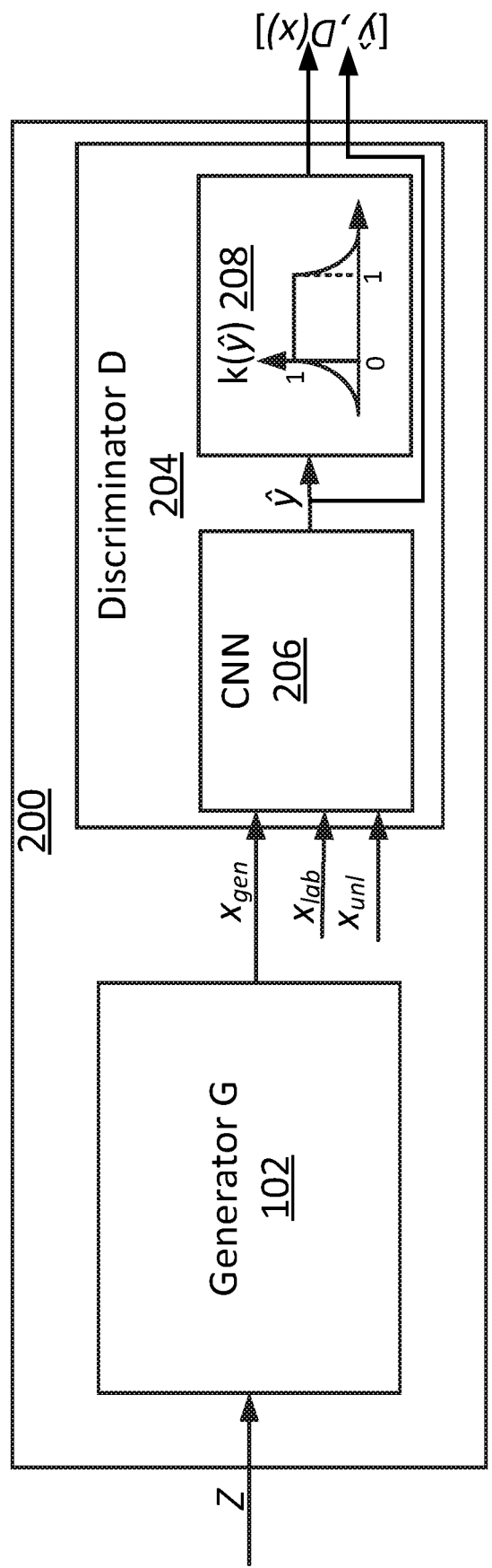
FIG. 2 is a block diagram of a GAN according to a second example embodiment.

FIG. 2 illustrates a GAN 200 according to a further example embodiment that is also configured to implement semi-supervised regression. GAN 200 is similar to GAN 100 with the exception of differences that will be apparent form the Figures and the following description. GAN 200 includes a generator 102 that is identical to the generator 102 described above. However, the discriminator 204 of GAN 200 varies from the discriminator 104 of GAN 100 in that a kernel function 208 is included after the output of the discriminator CNN 206. Instead of having two outputs from the CNN 206 as in discriminator 104, in discriminator 204 only one regression output is predicted by the CNN 206, namely the predicted continuous label $\hat{y}$. The predicted labels $\hat{y}$ are used as an input to kernel function 208, which assigns an probability index value D(x) for each sample based on the predicted continuous label $\hat{y}$ for the sample. In some examples the kernel function 208 may be implemented in a layer of the discriminator CNN 206.

Accordingly, instead of differentiating true and generated samples at the CNN 206 directly, discriminator 204 employs a separate kernel function 208 on the regression output of the CNN 206 for deciding whether the predicted continuous labels $\hat{y}$ for samples are realistic or not. The kernel function 208 is responsible to assign a probability index value to each input continuous label $\hat{y}$, based on the assumption that true labels can be mapped/normalized to a range of [0,1]. If the predicted continuous label $\hat{y}$ is within the normalized range of true labels (i.e. between 0 and 1), then the assigned probability index value D(x) is 1 and otherwise, the index will be assigned a number less than 1 according to the distance of the predicted value for the continuous label from the target range of true labels, as represented by the following equation:

$$\text{kernel function: } k(\hat{y}) = \begin{cases} e^{(\hat{y})} & 0 \leq \hat{y} \\ 1 & 0 < \hat{y} \leq 1 \\ e^{(1-\hat{y})} & \hat{y} > 1 \end{cases}$$

In FIG. 2:
Z: random noise vector
$x_{gen}$: generated samples
$x_{lab}$: labelled training samples
$x_{unl}$: unlabelled training samples
$\hat{y}$: predicted label for input sample $D(x)=k(\hat{y})$: probability index value representing how realistic the input sample is based on the predicted label $\hat{y}$ The discriminator loss function $Loss_D$ for discriminator 204 is the same as that for discriminator 104.

In example embodiments, a training algorithm is implemented in Python using a Python library "Theano" to perform multi-dimensional array computation efficiently, and deep learning library "lasagna" to train and build a neural network in Theano. An example embodiment of a training algorithm can be summarized as follows:

Inputs: Noise (z) for the generator 102. Labelled and unlabelled training samples ($x_{lab}$, $x_{unl}$) for the discriminator 104 or 204.

Outputs: Generator 102 creates unseen true-like samples ($x_{gen}$). Discriminator 104 or 204 provides: (i) probability $D(x)$ that discriminates the true ($x_{lab}$, $x_{unl}$) and the fake ($x_{gen}$) samples; and (ii) predicted continuous labels ($\hat{y}$).

Method:
1. Load data
2. Define networks for generator and discriminator. The networks are the stack of neural network layers in lasagne.
3. Define cost functions (e.g. loss functions) by using the outputs of discriminator. Feature matching loss is described by using the difference of intermediate layers of the generator and the discriminator.
4. Define Theano functions for initialization, for training the discriminator and the generator networks.
5. Define three other Theano functions that are used to compute the test error, generate samples and for the predicted labels of the generated samples.
6. Model Training:
   For each epoch:
   i. If epoch==0:
      Run Initialization Theano function for initializing the parameters of the generator and the discriminator.
   ii. For each batch of training set:
      Run discriminator and generator Theano functions alternatively.
      These functions update the discriminator and the generator network parameters by minimizing the loss functions of the networks.
   iii. For each batch of test set:
      Compute test-error using theano function
   iv. Report results In example embodiments, the GAN architecture described above can be applied on top of the improved-GAN described in the above noted paper, "T. Salimans, I. Goodfellow, W. Zaremba, V. Cheung, A. Redford, and X. Chen, "Improved techniques for Training GANs", https://arxiv.org/pdf/1606.03498.pdf, CoRR, abs/1606.03498, 2016."

Figure 3:
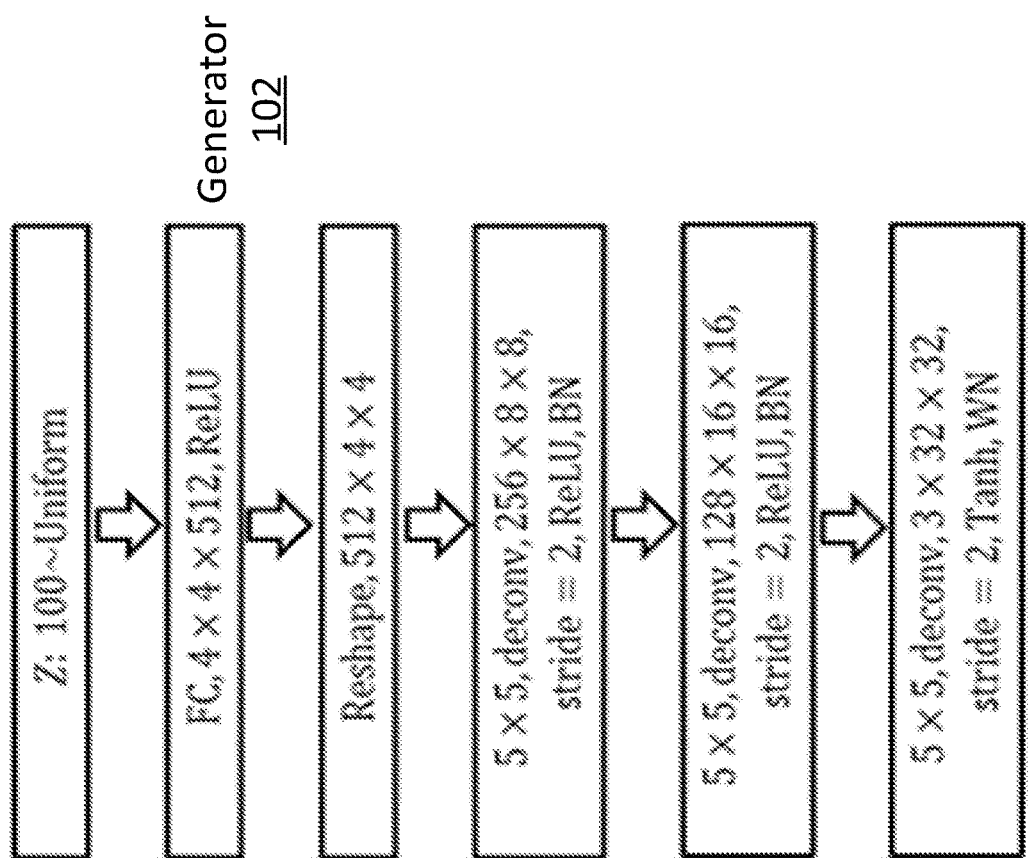
FIG. 3 is block diagram of a generator of the GAN of FIG. 1 or FIG. 2, according to an example embodiment.
Figure 5:
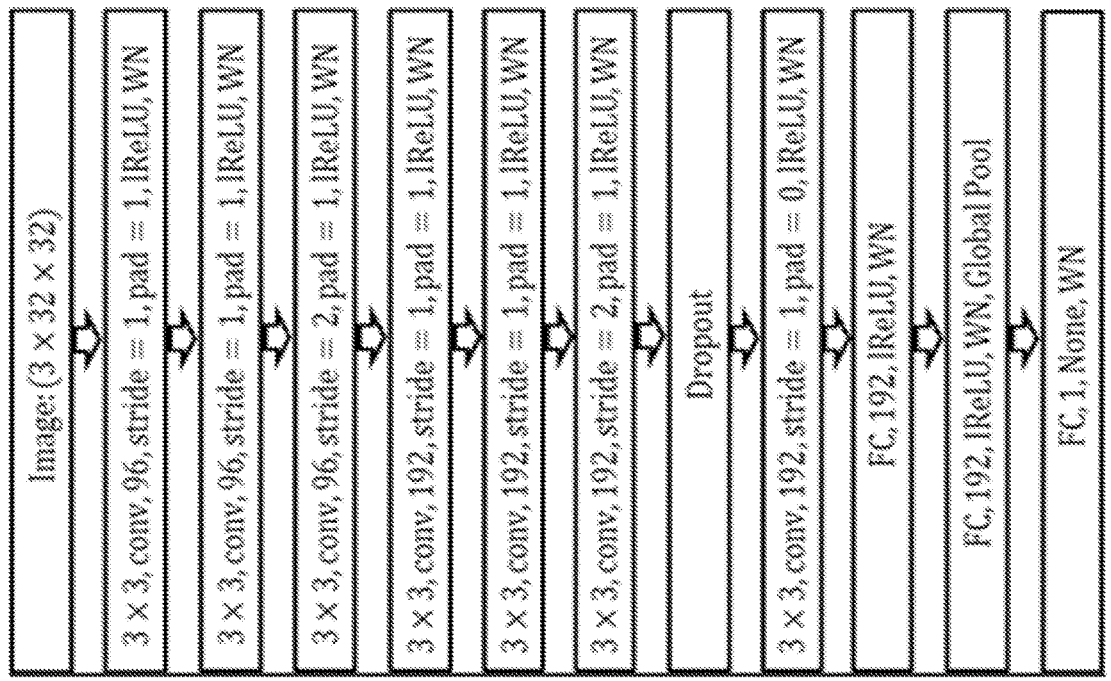
FIG. 5 is block diagram of a discriminator of the GAN of FIG. 2 according to an example embodiment.
Figure 4:
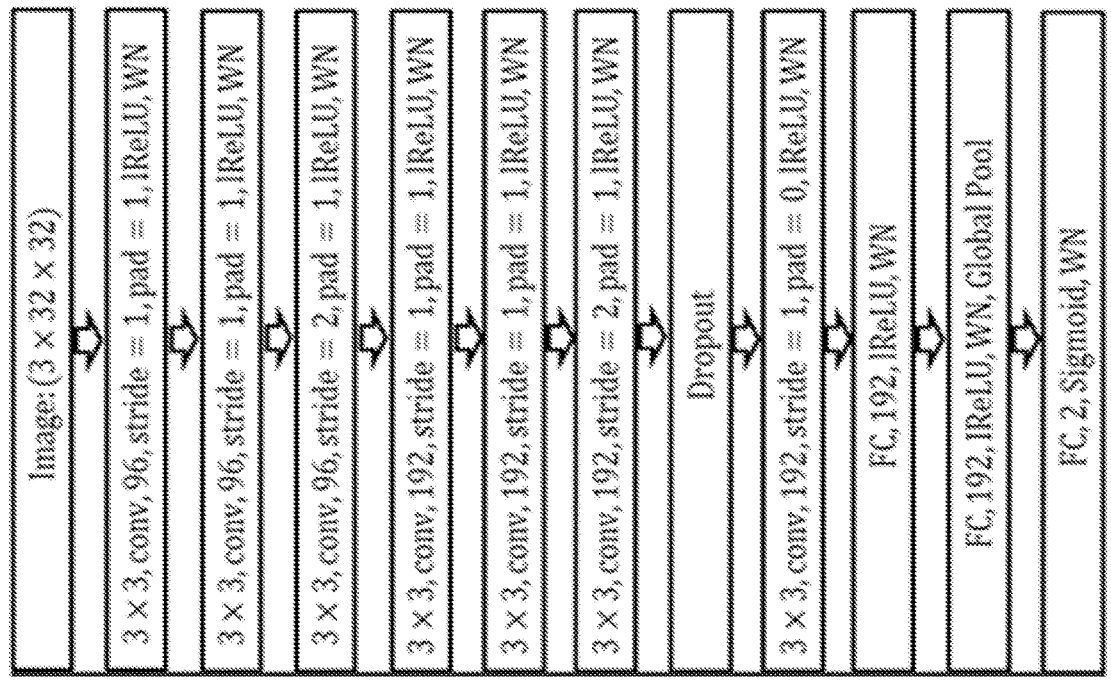
FIG. 4 is block diagram of a discriminator of the GAN of FIG. 1 according to an example embodiment.

In example embodiments, the generator 102 contains a 4-layer deep CNN with batch normalization, a representation of which is shown in Figure generator 102 is shown in FIG. 3. In example embodiments, the discriminator 104 or 204 contains a 9-layer deep CNN with weight normalization and dropout. An example of discriminator 104 is shown in FIG. 4 and an example of discriminator 204 is shown in FIG. 5. The example generator and discriminator architectures shown in FIGS. 3 to 5 are non-limiting examples. Generators and discriminators with different numbers of layers and different layer configurations than shown in FIGS. 3 to 5 can be used in other embodiments.

In at least some applications, GAN 100 and 200 can be used to implement semi-supervised regression learning in a generative adversarial network. As a continuous label, regression solution, GAN 100, 200 can, in at least some applications perform better in solving regression problems than using semi-supervised GANs for classification by avoiding the discretization error which is inevitable when applying semi-supervised classification techniques to regression problems. Additionally, GAN 100, 200 as described above can requires less parameters and training time, and also can offer both classification and regression semi-supervised learning. The discriminators 104, 204 can efficiently handle the regression task and handle both labeling and discriminating samples simultaneously.

In example embodiments, the improved GAN techniques described above provide a semi-supervised learning technique based on generative models to address regression problems. In GAN 100, 200, the discriminator network 104, 204 is configured to receive an input sample (e.g. a generated sample $x_{gen}$, a labelled training sample $x_{lab}$, or an unlabelled training sample $x_{unl}$), predict a continuous label $\hat{y}$ for the input sample, and generate a probability index $D(x)$ that indicates whether the input sample is a fake sample (e.g. a generated samples) or a real sample (e.g. a labelled training sample $x_{lab}$, or an unlabelled training sample $x_{unl}$). GAN 100, 200 are directed to semi-supervised learning for the regression problem of predicting a continuous label for an input sample. An example of a continuous label is a steering angle, and in this regard GAN 100, 200 can be applied, for example to predicting steering angles for autonomous driving. In GAN 100, the discriminator 104 CNN has two outputs, (i) one for regression (predicted continuous labels ($\hat{y}$)) and (ii) one for discrimination (probability $D(x)$ that discriminates the true ($x_{lab}$, $x_{unl}$) and the fake ($x_{gen}$) samples). In GAN 200, the discriminator 204 CNN 206 has a single output for regression (predicted continuous labels ($\hat{y}$), which is applied to a kernel function 208 that outputs a discrimination index $D(x)$ indicating to what extent the predicted continuous labels $\hat{y}$ are realistic. The kernel function 208 operates on the assumption that the continuous labels for real dataset samples (e.g. training dataset samples) can be normalized between [0, 1]. If the predicted continuous labels fall within the range of [0,1], they are determined to be realistic and assigned a discrimination index of $D(x)=1$. If the predicted continuous labels fall outside the range, the discrimination index value goes to zero exponentially in dependence on the degree the predicted continuous label falls outside of the range.

Figure 6:
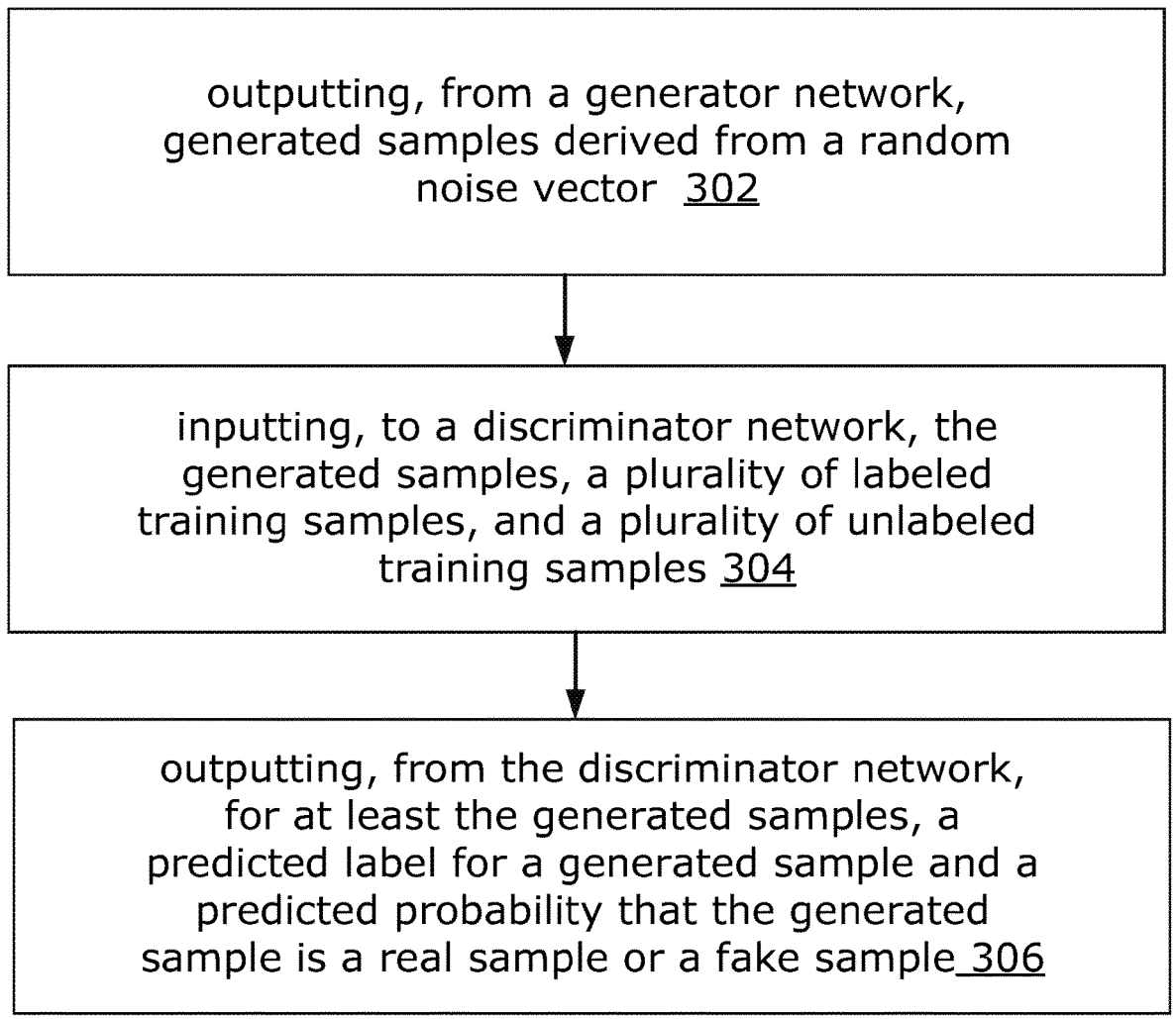
FIG. 6 is a flow chart showing a method performed by the GAN of FIG. 1 or FIG. 2 according example embodiments.

As illustrated in FIG. 6, an example embodiment provides a method for performing semi-supervised regression with generative adversarial networks, comprising: outputting, from a generator network, generated samples derived from a random noise vector (block 302); inputting, to a discriminator network, the generated samples, a plurality of labelled training samples, and a plurality of unlabelled training samples (block 304); outputting, from the discriminator network, for at least the generated samples, a predicted continuous label for a generated sample and a predicted probability that the sample is a real sample or a fake sample (block 306).

The methods described above can be used to produce realistic labelled samples that can then be used as training samples for machine learning tasks in artificial intelligence (AI) systems. It will be appreciated that training data is of paramount importance for machine learning tasks. For supervised learning algorithms, training data requires appropriate labelling for quality training. Lack of enough labelled training samples for supervised training leads to poor learning. However, collecting sufficient training samples and labelling them can be time consuming, difficult and costly. The cost of data collection for training samples can vary depending on application, and one application in particular that can have a high training sample cost is training autonomous driving (AD) systems.

In this regard, example embodiments of the methods and systems described above in respect of FIGS. 1-6 will now be described in the context of a system for creating cost effective labelled training samples for AD systems. In example embodiments, the label applied to a data sample is a continuous label, meaning that it represents a continuous variable (compared to a discrete classification label that represents a discrete variable).

Autonomous driving (AD) has gained attention from researchers and industry in the recent years. To make the driving task autonomous and replace a human driver, the AD system should be able to recognize its peripheral environment and act accordingly. Machine learning can facilitate this task for the AD system. Machine learning is employed for different purposes in AD systems such as imitating driver behavior, vehicle detection, lane detection, and end-to-end learning. An example of end-to-end learning is described in M. Bojarski, D. Del Testa, 230 D. Dworakowski, B. Firner, B. Flepp, P. Goyal, L. D. Jackel, M. Monfort, U. Muller, J. Zhang, et al. "End to end learning for self-driving cars", arXiv:1604.07316v1 [cs.CV] 07316, 25 Apr. 2016 ("Bojarski").

In Bojarski, a convolutional neural network (CNN) was trained, in a supervised manner, to map raw pixels from a single front-facing camera directly to steering commands. The CNN was able to learn meaningful road features from a combination of the front camera image and a very sparse training signal (a human controlled steering angle) without needing to decompose the front camera image into the road, lane marking detection, semantic abstraction, path planning, or control.

In the example of Bojarski, training data for the AD system comes from a human controlled steering signal that is combined with image data from a camera mounted on a moving vehicle. Physically collecting training data can be both costly and inefficient. Training AD systems needs a large number of training samples to ensure that the system can learn all possible scenarios such as different driving states, road conditions, and weather conditions. Failing to learn a specific case by the AD system may result in safety problems.

Figure 7:
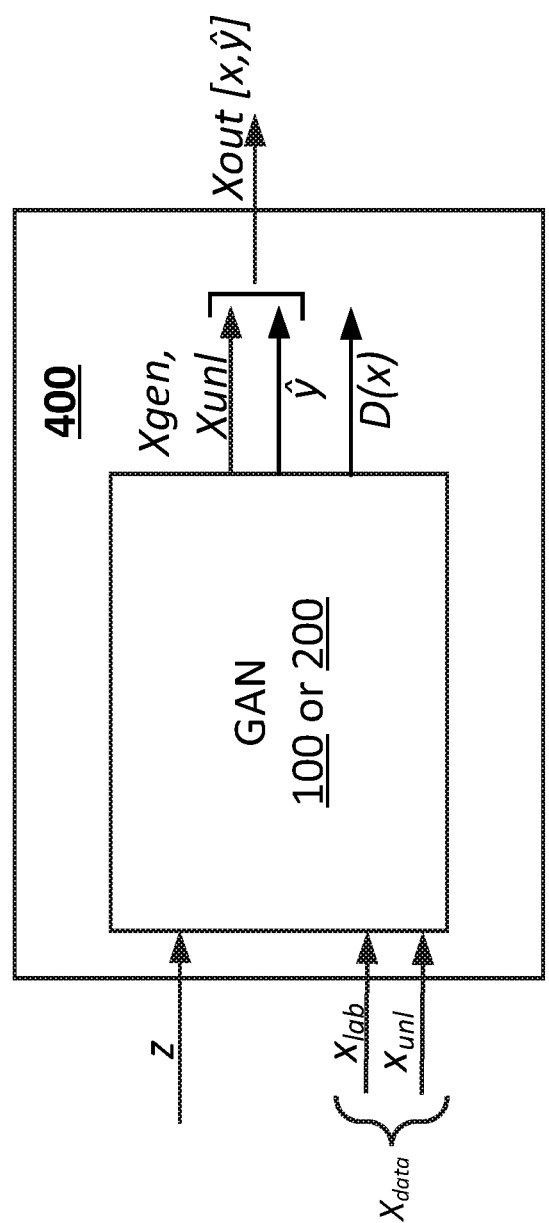
FIG. 7 shows an example of a GAN implemented semi-supervised regression system in accordance with an example embodiment.

Accordingly, in example embodiments, the semi-supervised, regression, GAN-based system and method described above is used to produce a robust set $x_{out}$ of labelled samples $x_{out}$ that can subsequently be used to train AD systems, including in the context of end-to-end training. In particular, the output samples $x_{out}$ each include an image that realistically simulates a front camera image and a continuous label for the image in the form of a steering angle. The output samples $x_{out}$ are produced based on inputs to GAN 100 or 200 that include a noise signal z, and an initial training dataset $x_{data}$ that includes both labelled training samples $x_{lab}$ and unlabelled training samples $x_{unl}$. In this regard, FIG. 7 shows an example of a GAN implemented semi-supervised regression system 400 for producing labelled training samples $x_{out}$, using either GAN 100 or 200, in dependence on inputs noise z and initial training data set $x_{data}$.

In system 400, the initial training data set $x_{data}$ includes L labelled samples $x_{lab}$ and M unlabelled samples $x_{unl}$, where M>>L. In some example embodiments, the number M of unlabelled samples is at least 10 times greater than the number of labelled samples. Each labelled sample $x_{lab}$ represents an image captured by a forward facing camera on a moving vehicle and an associated label that represents a steering angle. In one example, the image sample takes the form of a JPG file and the associated label is represented as a text concatenation of the JPG file name and a steering angle. Each unlabelled sample $x_{unl}$ represents an image captured by a forward facing camera on a moving vehicle. In some example embodiments, the labelled samples $x_{lab}$ of the initial training data set $x_{data}$ have been collected using moving vehicle with the images and steering angle being recorded simultaneously.

Figure 8:
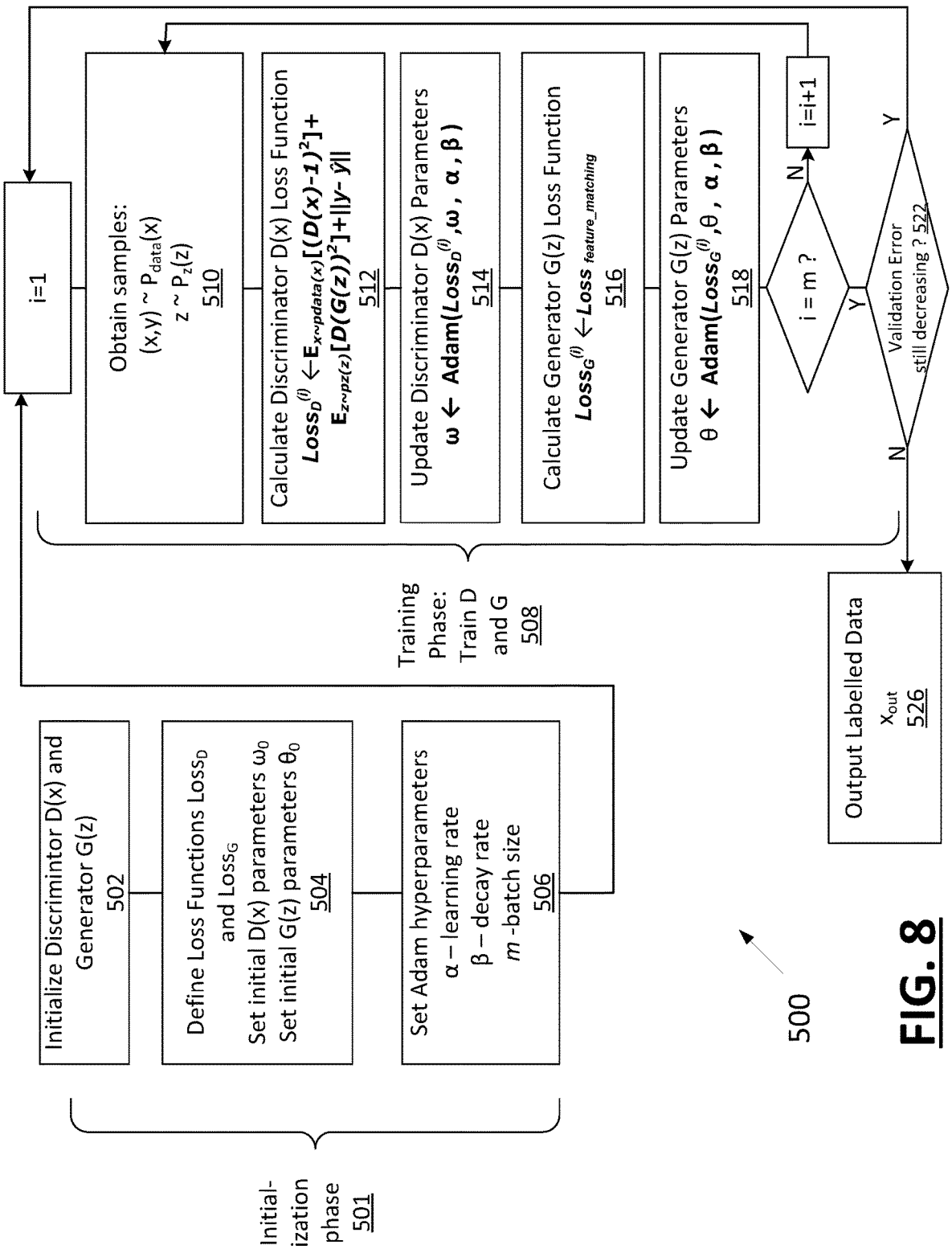
FIG. 8 shows a method implemented by the semi-supervised regression system of FIG. 7 according to an example embodiment.

FIG. 8 illustrates a semi-supervised regression method 500 implemented on system 400 according to example embodiments. In example embodiments, the method 500 of FIG. 8 is implemented on a processing system 600 (described below) using the Python programming language and the Python libraries Theano and Lasagne. The Adam optimization algorithm is used to iteratively update the discriminator and generator networks. In alternative embodiments, other programming languages, libraries and optimization algorithms may be used.

The method 500 begins with an initialization phase 501 that includes a step of defining and initializing the CNNs that are used to implement the discriminator 104 or 204 and the generator 102 (block 502). Although many different neural network architectures are possible, in example embodiments the architectures noted above in respect of FIGS. 3 and 4 or 5 are defined for generator 102 and discriminator 104, 204 respectively.

As indicated at block 504, the loss functions $LOSS_D$ and $Loss_G$ for the discriminator 104, 204 and generator 102 are defined as part of the initialization phase 501. In example embodiments the loss function $LOSS_G$ for the generator 102 is defined as the feature matching loss, $Loss_{feature\_matching}$:

$$LOSS_G = Loss_{feature\_matching}$$

In example embodiment the loss function $Loss_D$ for the discriminator 104, 204 is defined as noted above, namely combining the unsupervised GAN loss function and a supervised regression loss as represented by the equations:

$$LOSS_D = L_{unsupervised} + L_{supervised} \quad \text{(Equation 3)}$$

$$L_{supervised} = \|y - \hat{y}\| \quad \text{(Equation 4)}$$

$$L_{unsupervised} = E_{x \sim p_{data}(x)}[(D(x)-1)^2] + E_{z \sim p_z(z)}[(D(G(z))^2] \quad \text{(Equation 5)}$$

Variations of the above loss functions can be defined and applied in different embodiments.

As further indicated at block 504, the discriminator D(x) 104, 204 is initialized with an initial set of discriminator parameters $\omega_0$ and the generator G(z) 102 is initialized with an initial set of generator parameters $\theta_0$. As indicated at block 506, the Adam optimizer parameters are then set. In a non-limiting example, learning rate $\alpha$ is set to 0.0005, decay rate $\beta$ is set to 0.5 and the batch size is set to 100. However, many other different combinations of Adam optimizer parameters could be used in other examples embodiments.

The initialization phase 501 is followed by an iterative training phase 508 that is repeated until the network parameters are converged In example embodiments, the training phase 508 is performed on a group of data sample batches, with each data sample batch including multiple data samples. In the illustrated embodiment, the number of batches processed per training phase 508 is equal to "m". As represented by blocks 510 to 518, for each epoch over m batches (where 1≤i≤m), the following actions are repeated for each batch of data samples. First, as shown in block 510, data samples z are generated by generator network G(z) 102, and real image and label data samples x, y are obtained from a training data set $x_{data}$ that is a source of labelled samples $x_{lab}$ (which includes image samples and associated true labels y) and unlabelled samples, $x_{unl}$. As shown in block 512, the discriminator D loss function $LOSS_D$ is calculated based on the current batch of samples, and as shown in block 514 the resulting $LOSS_D$ is provided to an Adam optimizer to obtain updated discriminator parameters ω. Then, as shown in block 516, the generator G(x) loss function $LOSS_G$ is calculated based on the current batch of samples, and as shown in block 518 the resulting $LOSS_G$ is provided to an Adam optimizer to obtain updated generated parameters θ. The actions shown in blocks 510 to 518 are repeated for all of the m batches in the current epoch, with the discriminator and generator network loss functions and parameters being repeatedly calculated and updated in alternating fashion.

As indicated in block 522, after all of the m-batches have been processed, a determination is then made whether the validation error on a test dataset is still decreasing. As known in the art, the test dataset is a predetermined dataset that is used to determine when the discriminator training has reached a level where the validation error reaches its minimal point. A decreasing validation error indicates that the generator weighting parameters θ still have not have converged. If the validation error continues to decrease, then the training phase 508 enters another iteration and the actions described above in respect of blocks 510 to 518 are repeated for another epoch over m batches. In some examples, the same training dataset samples $x_{unl}$ and $x_{lab}$ may be reused during subsequent repetitions of the training phase, in combination with newly produced generated samples $x_{gen}$.

In some example embodiments, when the validation error on a test dataset is no longer decreasing, the GAN 100, 200 of system 400 is considered trained. As indicated in block 526, the system 400 is then trained and ready to output realistic labelled data samples $x_{out}$ that each include a data sample (e.g. front camera image) and a continuous label that is a continuous number between 0 and 1 (e.g. a steering angle associated with the front camera image). In particular, once the GAN 100,200 is trained, the generator G 102 is configured to produce realistic generated samples $x_{gen}$ and the discriminator D 104, 204 is configured to apply accurate predicted continuous labels ŷ to such samples, as well as to unlabelled samples $x_{unl}$. In the case of a generated sample input, the output sample $x_{out}$ will include the generated sample $x_{gen}$ with its associated predicted continuous label ŷ, and in the case of a unlabelled training sample input, the output sample $X_{out}$ will include the previously unlabelled sample $x_{unl}$ with its newly associated predicted continuous label ŷ.

Accordingly, once trained the GAN 100, 200 can be used to produce realistic labelled data $x_{out}$ based on noise input z, and also to label previously unlabelled real data samples In example applications, each output labelled data sample $x_{out}$ includes a front camera image and a steering angle label that can then be used in end-to-end learning for an AD system. In some examples the labelled data $x_{out}$ may be provided directly in real-time to an AD system for training purposes as it is output from system 400, and in some examples it may be stored for future use, for example in a databank.

In some examples where the predicted label ŷ output from GAN 100,200 is a normalized value between 0 and 1, a conversion function can be applied to map the normalized value to an actual steering angle. In some examples, the steering angle label may be resolved to 6 or more decimal places.

In some example embodiments, once the system 400 is trained it can also be used to apply labels to unlabelled data samples $x_{unl}$, and thereby convert previously unlabelled real images to labelled data samples $x_{lab}$. In some examples, once the system 400 is trained, the discriminator 104, 204 can be incorporated into an AD system and configured to receive real-time images from a front-end camera on a moving vehicle and actively provide steering angle control for the moving vehicle.

A pseudo-code algorithm that is similar to the initiation phase 501 and training phase 508 of method 500 is represented in the following table:

TABLE 1

Semi-Supervised regression with GAN.
Default values: α = 0.0005, β = 0.5

Require: The Adam hyperparameters α, β, and the number of batches m
Require: Initial discriminator parameters $ω_0$ and initial generator parameters $θ_0$
    for θ has not converged do
        for i = 1, 2, ..., m do
            sample real data x, y~$P_{data}$(X), z~$P_z$(z)
            $L_D^{(i)}$
                ← $E_{x \sim P_{data}(x)}[(D(x) - 1)^2] + E_{z \sim P_z(z)}[D(G(z))^2]$
                + ||y − ŷ||
            w ← Adam($L_D^{(i)}$, w, α, β)
            $L_G^{(i)}$ ← $L_{feature\_matching}$
            θ ← Adam($L_D^{(i)}$, θ, α, β)
        end for
    end for The GAN architectures described above are not critical, but instead used just as one example. Any revision to the layers of the CNN, such as weights, activation functions and normalization methods, leading to a different neural net would be possible.

Figure 9:
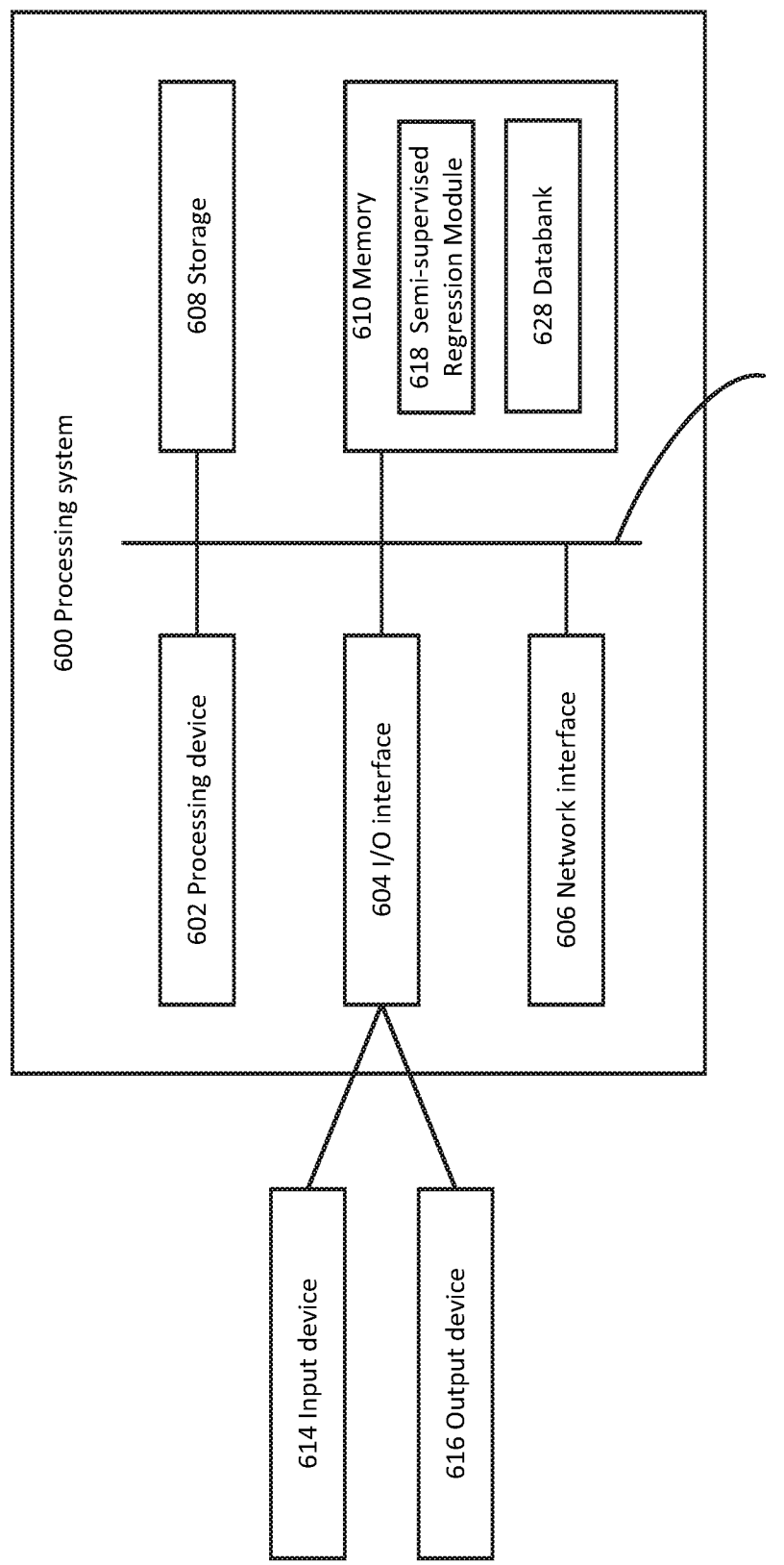
FIG. 9 is a block diagram of a processing system that can be used to implement a GAN and semi-supervised regression system according to example embodiments.

FIG. 9 is a block diagram of an example simplified processing system 600, which may be used to implement embodiments disclosed herein, and provides a higher level implementation example. The methods of FIG. 6 and FIG. 8 may be implemented using the example processing system 600, or variations of the processing system 600. The processing system 600 could be a server or a desktop terminal, for example, or any suitable processing system. Other processing systems suitable for implementing embodiments described in the present disclosure may be used, which may include components different from those discussed below. Although FIG. 9 shows a single instance of each component, there may be multiple instances of each component in the processing system 600.

The processing system 600 may include one or more processing devices 602, such as a processor, graphics processing unit, a microprocessor, an application-specific integrated circuit (ASIC), a field-programmable gate array (FPGA), a dedicated logic circuitry, or combinations thereof. The processing system 600 may also include one or more input/output (I/O) interfaces 604, which may enable interfacing with one or more appropriate input devices 614 and/or output devices 616. The processing system 600 may include one or more network interfaces 606 for wired or wireless communication with a network (e.g., an intranet, the Internet, a P2P network, a WAN and/or a LAN) or other node. The network interfaces 606 may include wired links (e.g., Ethernet cable) and/or wireless links (e.g., one or more antennas) for intra-network and/or inter-network communications.

The processing system 600 may also include one or more storage units 608, which may include a mass storage unit such as a solid state drive, a hard disk drive, a magnetic disk drive and/or an optical disk drive. The processing system 600 may include one or more memories 610, which may include a volatile or non-volatile memory (e.g., a flash memory, a random access memory (RAM), and/or a read-only memory (ROM)). The non-transitory memory(ies) 610 may store instructions for execution by the processing device(s) 602, such as to carry out examples described in the present disclosure, for example to perform encoding or decoding. The memory(ies) 610 may include other software instructions, such as for implementing an operating system and other applications/functions. In some examples, one or more data sets and/or modules may be provided by an external memory (e.g., an external drive in wired or wireless communication with the processing system 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 612 providing communication among components of the processing system 600, including the processing device(s) 602, I/O interface(s) 604, network interface(s) 606, storage unit(s) 608 and/or memory(ies) 610. The bus 612 may be any suitable bus architecture including, for example, a memory bus, a peripheral bus or a video bus.

In FIG. 9, the input device(s) 614 (e.g., a keyboard, a mouse, a microphone, a touchscreen, and/or a keypad) and output device(s) 616 (e.g., a display, a speaker and/or a printer) are shown as external to the processing system 600. In other examples, one or more of the input device(s) 614 and/or the output device(s) 616 may be included as a component of the processing system 600. In other examples, there may not be any input device(s) 614 and output device(s) 616, in which case the I/O interface(s) 604 may not be needed.

The memory(ies) 610 may include instructions for a semi-supervised regression module 618 that, when executed, cause the processing system 600 to perform a method such as the methods of FIG. 6 or 8. The memory(ies) 610 may further store training dataset $x_{data}$ and produced data samples $x_{out}$ in a databank 628.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A method for training a generative adversarial network (GAN) that includes a generator comprising a first neural network and a discriminator comprising a second neural network, comprising:
   outputting, from the first neural network, generated samples derived from a random noise vector;
   inputting, to the second neural network, the generated samples, a plurality of labelled training samples, and a plurality of unlabelled training samples; and
   outputting, from the second neural network, a predicted continuous label for each of a plurality of the generated samples and unlabelled samples.

2. The method of claim 1 wherein the second neural network outputs each continuous label as a normalized value.

3. The method of claim 2 comprising outputting from the second neural network a probability that an inputted sample is a real sample.

4. The method of claim 2 comprising determining a probability that a generated sample is a real sample based on the continuous label predicted for the generated sample.

5. The method of claim 4 wherein determining the probability is performed at a kernel function and is based on whether the normalized value for a continuous label falls within a predetermined range.

6. The method of claim 1 wherein the labelled training samples include a series of front camera image samples for a moving vehicle that are each labelled with a steering angle.

7. The method of claim 1 comprising, until parameters of the neural networks converge:
   repeating the outputting of generated samples derived from the first neural network, the inputting of the generated samples, labelled training samples, and unlabelled training samples to the second network, and the outputting predicted continuous labels from the second neural network, and, during each repetition, calculating respective loss functions for the second neural network and the first neural network, and adjusting weighting parameters of the second neural network and the first neural network based on the calculated loss functions.

8. The method of claim 7 wherein the loss function for the first neural network includes a feature matching loss function based on a difference between an output of an intermediate layer of the second neural network for the training samples and generated samples respectively.

9. The method of claim 7 wherein the loss function for the second neural network is a combination of a supervised portion and an unsupervised portion.

10. The method of claim 9 wherein the supervised portion is based on a difference between real labels and predicted continuous labels for the labelled samples provided to the second neural network.

11. A system for training a generative adversarial network (GAN) that includes a generator comprising a first neural network and a discriminator comprising a second neural network, the system comprising:
    a processing device; and
    a memory coupled to the processing device, the memory storing computer-executable instructions that, when executed by the processing device, cause the system to:
    define the first neural network and the second neural network;
    output, from the first neural network, generated samples derived from a random noise vector;
    input, to the second neural network, the generated samples, a plurality of labelled training samples, and a plurality of unlabelled training samples; and
    output, from the second neural network, a predicted continuous label for each of a plurality of the generated samples and unlabelled samples.

12. The system of claim 11 wherein the second neural network outputs each continuous label as a normalized value.

13. The system of claim 12 wherein the instructions, when executed by the processing device, cause the system to output from the second neural network a probability that an inputted sample is a real sample.

14. The system of claim 12 wherein the instructions, when executed by the processing device, cause the system to determine a probability that a generated sample is a real sample based on the continuous label predicted for the generated sample.

15. The system of claim 14 wherein the instructions, when executed by the processing device, cause the system to define a kernel function and the probability is determined at the kernel function based on whether the normalized value for a continuous label falls within a predetermined range.

16. The system of claim 11 wherein the labelled training samples include a series of front camera image samples for a moving vehicle that are each labelled with a steering angle.

17. The system of claim 11 wherein the instructions, when executed by the processing device, cause the system to, until parameters of the neural networks converge:
    repeat the output of generated samples derived from the first neural network, the input of the generated samples, labelled training samples, and unlabelled training samples to the second network, and the output of predicted continuous labels from the second neural network, and, during each repetition, calculate respective loss functions for the second neural network and the first neural network, and adjust weighting parameters of the second neural network and the first neural network based on the calculated loss functions.

18. The system of claim 17 wherein the loss function for the first neural network includes a feature matching loss function based on a difference between an output of an intermediate layer of the second neural network for the training samples and generated samples respectively.

19. The system of claim 17 wherein the loss function for the second neural network is a combination of a supervised portion and an unsupervised portion.

20. The system of claim 19 wherein the supervised portion is based on a difference between real labels and predicted continuous labels for the labelled samples provided to the second neural network.

21. A computer program product comprising a computer readable medium storing computer executable instructions that are configured to cause a processing system perform a method of:
    defining a generative adversarial network (GAN) that includes a generator comprising a first neural network and a discriminator comprising a second neural network;
    outputting, from the first neural network, generated samples derived from a random noise vector;
    inputting, to the second neural network, the generated samples, a plurality of labelled training samples, and a plurality of unlabelled training samples; and
    outputting, from the second neural network, a predicted continuous label for each of a plurality of the generated samples and unlabelled samples.

* * * * *